Aug. 10, 1937.  S. S. LEAF ET AL  2,089,923
ICE CREAM CONE MACHINE
Filed Oct. 29, 1934   2 Sheets-Sheet 2
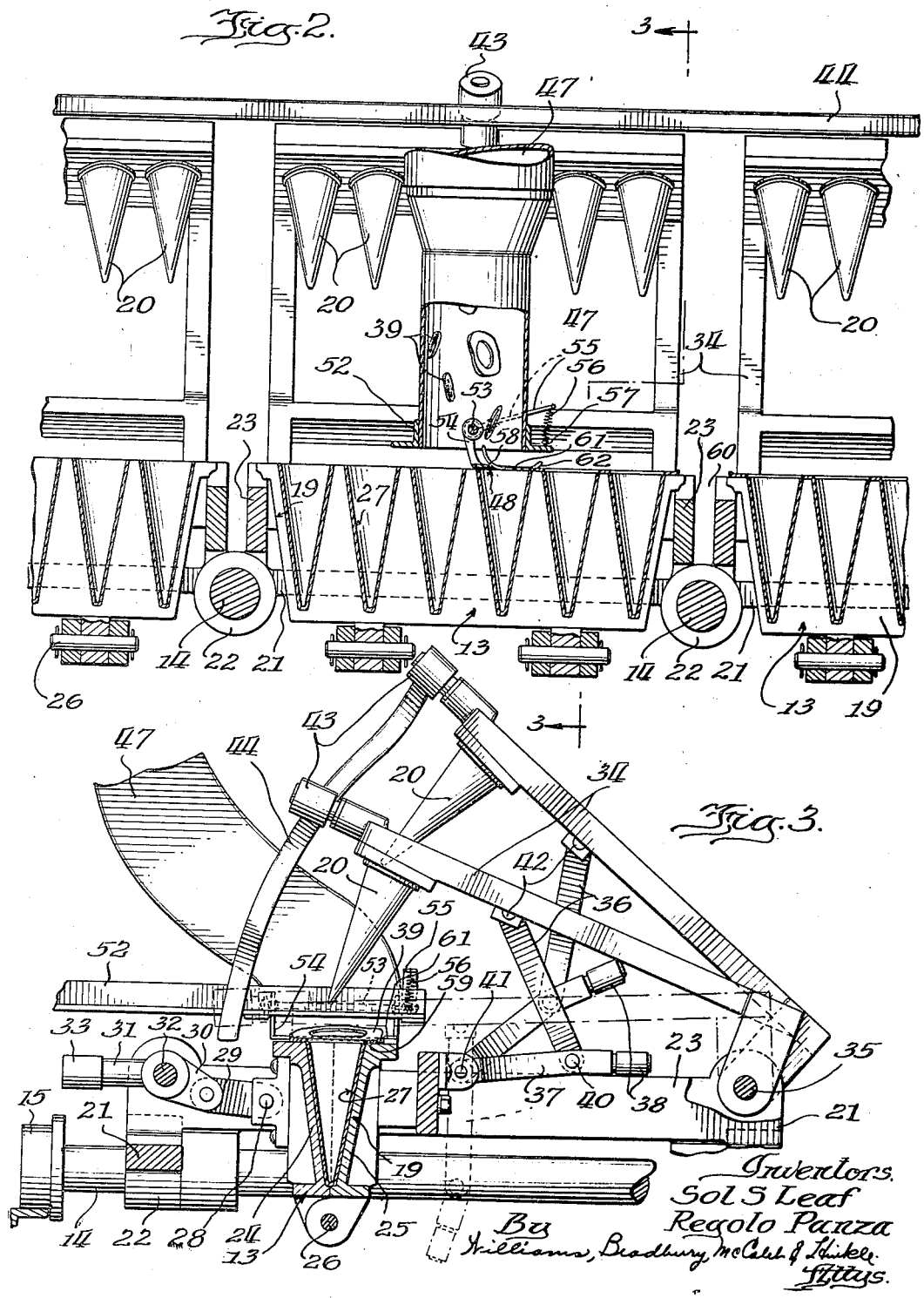

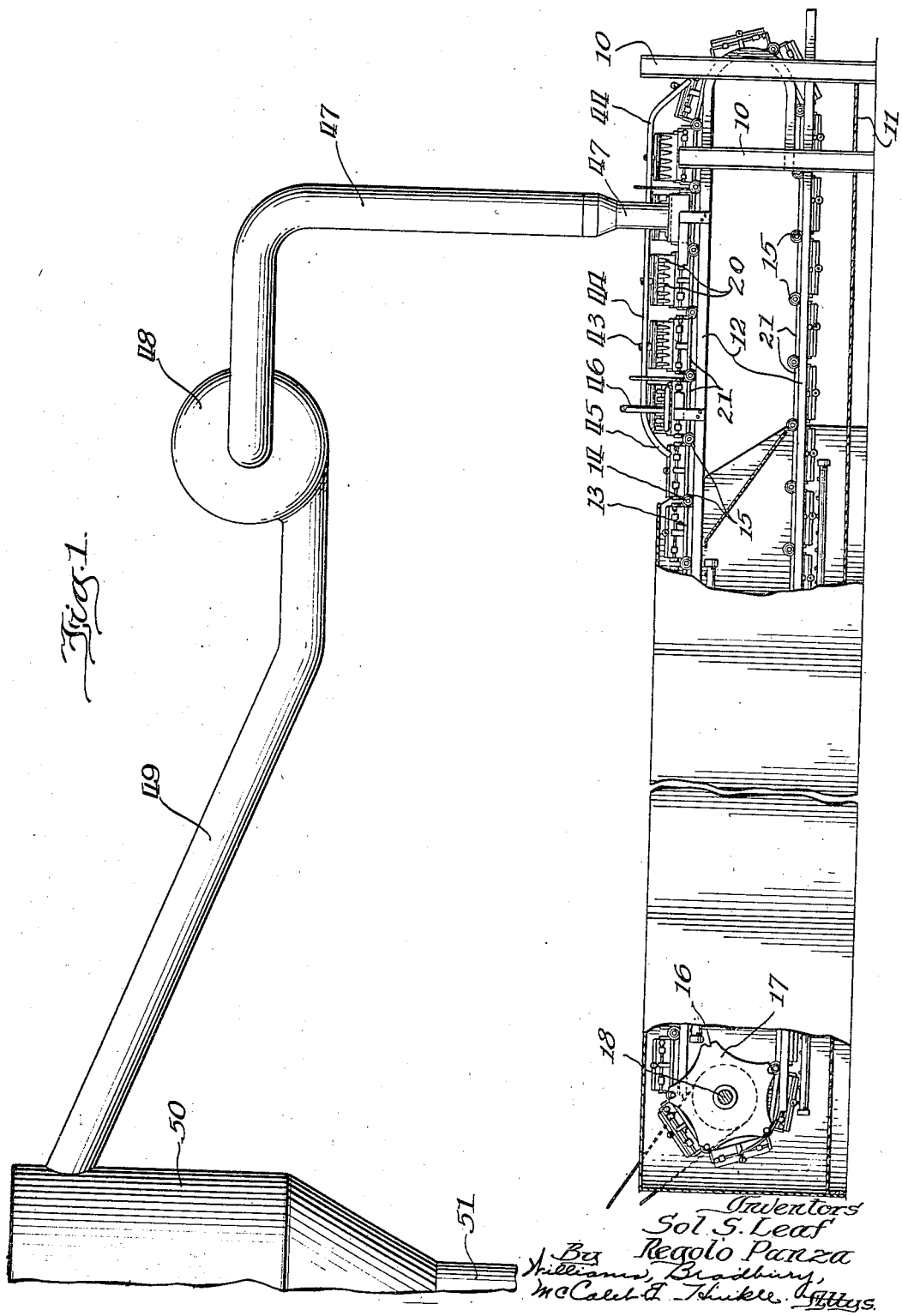

Patented Aug. 10, 1937

2,089,923

UNITED STATES PATENT OFFICE 2,089,923

ICE CREAM CONE MACHINE

Sol S. Leaf and Regolo Panza, Chicago, Ill., assignors, by mesne assignments, to Milko Cone & Baking Co., Inc., Chicago, Ill., a corporation of Illinois Application October 29, 1934, Serial No. 750,450

8 Claims. (Cl. 107—58)

The present invention relates to ice cream cone machines, and is particularly concerned with improvements in ice cream cone machines relating to the trimming of the excess pastry from the mouth of the cone, and with means for eliminating the waste incidental to the filling of the mould with an excess of pastry, and the trimming to produce a finished cone.

According to the methods of the prior art, some cone machines have been built upon the principle of endeavoring to effect a perfect filling of the mould by accurately measuring the amount of dough placed in the mould. This is practically impossible of accomplishment and therefore results in the imperfect filling of the mould, particularly at the mouth or upper edge of the cone, although the amount of waste of the pastry is reduced over the other system in which slightly more dough is employed.

Other machines are built upon the principle that it is practically impossible to accurately predetermine just how much dough is needed for any mould, and in such machines a slight excess of dough is employed so that it is necessary to trim the excess material from the top of the cone, and this has generally been accomplished by rotary knives which travel about the top of the mould.

One of the objects of the present invention is the provision of an improved machine by means of which waste of the dough will be absolutely eliminated, and perfect cones may be formed without fail.

Another object of the invention is the provision of an improved apparatus for handling the pastry which is trimmed from the cone, and which may be used over again to eliminate expense due to waste.

Another object of the invention is the provision of an improved form of trimming apparatus or machinery by means of which perfect ice cream cones may be formed with a minimum amount of breakage or imperfect products.

Another object of the invention is the provision of an improved ice cream cone forming apparatus which is simple, sturdy, capable of economical manufacture and sale, and adapted to the fast operation of any machine for forming ice cream cones.

Other objects will appear from the following description, reference being had to the accompanying drawings, in which similar characters of reference indicate similar parts throughout the several views.

Referring to the drawings, of which there are two sheets:

Fig. 1 is a diagrammatic side elevational view of an ice cream cone machine and its accompanying apparatus constructed according to the present invention;

Fig. 2 is a fragmentary front elevational view in partial section, the section being taken on a plane determined by the axis of the cone moulds; and Fig. 3 is a fragmentary transverse sectional view taken on the plane of the line 3—3 of Fig. 2.

Referring to Fig. 1, the ice cream cone machines constructed in accordance with the present invention preferably include a suitable metallic frame work comprising suitable vertical frame members 10, with horizontal frame members 11, 12 for the purpose of supporting an endless belt or chain comprising a multiplicity of moulds 13, the moulds being pivoted together end to end at the points 14, where they are also provided with rollers 15 suitably supported on the frame members or guides 12. The trunnions at the pivotal points 14 project beyond the moulds in a lateral direction sufficiently to be received in the grooves 16 of the driving sprocket wheels 17 which are located at each side of the machine and rotatably mounted by means of the shaft 18. The shaft 18 is driven in any suitable way, as by means of an electric motor, thereby causing the moulds to progress along the frame work 10, 11, 12, toward the left at the top in Fig. 1, and toward the right at the bottom in Fig. 1.

Referring now to Figs. 2 and 3, each of the mould units 13 comprises a plurality of suitable female moulds 19 and a suitable plurality of male moulds 20. The moulds unit has a supporting frame work which may consist of a pair of longitudinally extending frame members 21, formed with bearings 22 at each end to be mounted on the shafts 14. Each of the female mould frameworks comprises upwardly projecting lugs 23 for supporting the female mould 19, which consists of two halves 24, 25, pivotally joined together by means of the pin 26. The mould halves 24 and 25 may be spread apart for the purpose of removal of the finished cones 27, and for this purpose the mould half 24 is pivotally connected at 28 by means of a link 29 to the arm 30 of a bell crank 31 which is pivoted at 32 on the frame work 21 for supporting the female mould. The bell crank arm 31 may have a roller or other suitable member 33 at its outer end for engaging suitable guides so that when the mould reaches a proper position the two halves 24 and 25 of the mould are spread apart by means of the engagement of the end 33 of bell crank 31 with a guide having a camming surface. Each of the female mould halves 24 and 25 comprises a metallic member which is substantially semi-conical in form, so that when the two halves are placed together they form a cavity which is generally conical in form for the purpose of forming the ice cream cones. It should be understood, however, that the present apparatus may be utilized for forming all types of ice cream receptacles of a similar character, provided they present the necessity for perfecting filling of the mould and trimming of the upper edges to finish the cone or receptacle.

The male moulds 20 comprise conical members, each of which is supported upon an elongated lever 34 which is pivoted at 35 on a part of the framework 21 of the mould unit. Lever 34 is connected by a link 36 to a second toggle link 37 having a roller 38 at its outer end. The toggle links 36 and 37 serve to draw the male moulds 20 into the batter, forcing it to spread upward and fill the space between the two parts of the mould, the excess 39 being shown in Fig. 3 spread out on top of the female mould. When the toggle levers 36 and 37 are in the position shown in dotted lines in Fig. 3, toggle lever 37 is adapted to exert considerable force on the moulds in drawing them together. Roller 38 engages a suitable camming guide for drawing the moulds 20 downward at the proper point during the progress of the mould units along the guides of the machine.

The toggle 36, 37 is locked by having the pivotal point 40 pass to the left beyond the line of the pivotal points 41, 42, being held there while the cone is baked and being tripped by a camming guide which engages the roller 38.

Levers 34 are also provided with rollers 43 at their outer ends for engaging the upwardly extending camming guide 44 which is adapted to lift the male moulds 20 and levers 34 to permit the proper trimming of the cones after they have been baked and to permit removal of the cones and refilling of the moulds. Referring to Fig. 1, it will be observed that the camming guide 44 extends from the right hand end of the machine to the point 45 where the refilling of the mould has been accomplished, and the moulds are again closed or brought into juxtaposition. The machine is preferably provided with suitable mould filling apparatus indicated in its entirety by the numeral 46 for placing in the female moulds 19 a suitable amount of batter.

According to the present methods and apparatus, however, a considerable excess of batter may be employed in filling the female moulds 19 so that this excess 39 when baked appears at the top of the cone 27 and female mould 19. Referring to Figs. 2 and 3, one of the most important features of the present invention is the improved trimming apparatus which is shown in detail in these figures. The machine is preferably provided with a suction conduit 47 which may be located immediately above the trimming knife 48. Suction conduit 47 leads to an electric motor blower 48, being connected to the intake side of said blower, the output of which is connected by conduit 49 to some form of dust collector 50 having a discharge port at its lower end 51. The blower 48 and conduits 47, 49, are adapted to suck up the pieces of excess pastry 39 as shown in Fig. 2, depositing them in the dust collector 50 where they are collected and may be further utilized.

According to the methods of the prior art, such excess pastry as was permitted to be used was wasted. We propose that such excess pastry be collected and reground and used as a filler or ingredient in the new mixtures of batter for the purpose of eliminating this waste and the present apparatus is adapted to accomplish the suitable collection of the trimmings of pastry.

The suction conduit 47 is suitably supported by means of angle irons 52 on the framework of the machine. These angle irons also pivotally support by means of a rod or shaft 53, a cutting knife which is carried by a pair of bell crank arms 54 fixedly connected to the outwardly projecting bell crank arm 55. The latter bell crank arm 55 is urged in a downward or clockwise direction by means of a spring 56 attached thereto, and having its other end attached to a pin 57 carried by the frame.

The two bell crank arms 54 support at their lower ends a substantially horizontally extending knife blade 48, the bottom of which is substantially flat and the top of which is beveled at 58 to form a cutting edge which is flush with the bottom of the knife blade 48. Knife blade 48 is located in such position that it slidably engages the flat top surfaces 59 of the female moulds and trims off smoothly and flush with these flat top surfaces the cones 27, removing every part of the excess pastry 39 which projects above the female cone moulds 19. As the cone moulds progress toward the left in Fig. 2 the knife blade 48 which is stationary with respect to that motion effects the trimming operation very quickly and cleanly, and suitable pressure is placed upon the blade by means of the spring 56 to hold it in engagement with the top of the female moulds. The beveling at 58 of the top of the blade also serves to keep the blade in engagement with the top of the mould.

As the blade 48 is urged into engagement with the trimming surface 59 and as the moulds are sometimes spaced from each other, as for example at the point 60 between the mould units, the blade 48 is preferably provided with a forwardly extending arm 61 having an upwardly turned camming end 62. The arm 61 extends forward far enough to span the space 60 between the mould units to prevent the knife from dropping down between the mould units and the upwardly extending camming end 62 is adapted to engage the approaching edge of any mould unit and lift the blade back up into its proper position in case the blade drops. The arm 61 is preferably placed at one side of the blade, as shown in Fig. 3, in order that it may ride on the trimming surface of the female mould at a point spaced from the excess pastry 39. The upwardly turned end 62 also serves to insure the sliding of the blade over the moulds without catching against any projections.

The suction conduit 47 is located in advance and to the rear of the blade 48 in such manner that as soon as the pieces of pastry are released from the cone by the blade they are sucked up into the conduit 47 and carried to the dust collector 50.

When the present trimming mechanism is employed, the cones are trimmed neatly and cleanly and there are practically no imperfect cones formed by the machine. Furthermore, when the present methods are employed the excess pastry is collected and again ground up to be used as an ingredient or filler, and a considerable excess of batter may be placed in the mould so as to insure the perfect filling of the cone so that there will be no imperfect cones.

The present methods of manufacture of ice cream cones contemplate the filling of the female mould with an excess of batter which is forced up to the top of the mould when the male mould is inserted and compressed downward into predetermined position. The moulds progress continuously from the filling position to the baking position, the filling apparatus having a step-by-step motion and being adapted to progress with the mould as the moulds are filled. After the moulds are filled and the batter is in proper position, the cone is baked and thereafter the moulds are separated and the excess of pastry trimmed off the top of the cone by the sliding engagement of the female mould with the knife blade.

The excess pastry is removed by suction from the vicinity of the blade and deposited in the collector and after a suitable amount has been collected it is ground up and the ground or comminuted material is used again as a filler or ingredient for new batter so that there is no waste whatever of cone material.

It will thus be observed that we have invented an improved ice cream cone machine, and improved methods whereby perfect cones may be formed at a minimum expense, and the cost of the cones is thereby reduced not only on account of the elimination of waste but because of the fact that the machine is adapted to form perfect cones and it is not necessary to throw away many or practically any of the cones manufactured thereby.

While we have illustrated and described a preferred embodiment of the invention many modifications may be made without departing from the spirit of the invention, and we do not wish to be limited to the precise details of construction set forth, but desire to avail ourselves of all changes within the scope of the appended claims.

Having thus described our invention what we claim as new and desire to secure by Letters Patent of the United States is:

1. In an ice cream cone machine the combination of a female mould of substantially conical shape for moulding a cone during the baking thereof, said mould having a trimming surface at the open end thereof, and a trimming knife comprising a blade extending transversely to the major axis of said mould, resilient means for urging said blade against said trimming surface, means for producing relative motion between said mould and said blade against the edge of said blade to trim a cone in said mould, and suction means disposed adjacent to said blade for removing by suction the excess material trimmed from the cone by said blade.

2. In an ice cream cone machine the combination of a supporting framework having guides with a plurality of mould units movably mounted on said guides, said mould units being joined end-to-end and comprising male and female mould members, means for moving the male mould members out of moulding position, trimming means slidably engaging the open end of the female mould comprising a knife blade extending in the direction contrary to the direction of movement of the mould units, said moulds being spaced from each other, and a guide shoe carried by said blade and adapted to span the space in said moulds to hold said blade in trimming position and to prevent said blade from moving into the space between said moulds.

3. In an ice cream cone machine the combination of a plurality of movable ice cream cone moulds, certain of said moulds being spaced from each other with a transversely extending knife blade for slidably engaging the open ends of the ice cream moulds or trimming off the excess pastry from cones in said moulds, and a forwardly projecting arm carried by said blade for spanning the space between said spaced moulds to prevent the blade from catching upon the approaching spaced mould.

4. In an ice cream cone machine the combination of a plurality of movable ice cream cone moulds, certain of said moulds being spaced from each other, with a transversely extending knife blade for slidably engaging the open ends of the ice cream moulds or trimming off the excess pastry from cones in said moulds, a forwardly projecting arm carried by said blade for spanning the space between said spaced moulds to prevent the blade from catching upon the approaching spaced mould, and resilient means for urging said blade and arm into engagement with said moulds.

5. In an ice cream cone machine, the combination of supporting means for female molds, said molds being provided with flat plates surrounding the openings in said molds, a trimming knife carried by said framework and having its cutting edge engaging said flat plates at the mold, spring means for pressing said trimming knife into resilient engagement with said flat plates, and means for effecting relative movement between said moulds and said trimming knife in a direction toward the knife, the knife extending at an acute angle to the plane of the flat plates, and means for spanning the spaces between separate molds, whereby the knife slides relative to the molds and plates and trims off the excess baked batter located on the plates.

6. In an ice cream cone machine, the combination of a plurality of movable ice cream cone molds with a supporting framework and means for moving said molds, a trimmmer knife for trimming excess baked batter from the ice cream cones before they are removable from the mold, and suction means located adjacent said trimmer knife for removing the excess pastry, whereby the pastry may be reclaimed and used in the manufacture of further ice cream cones.

7. In an ice cream cone machine, a trimming device comprising a knife movably mounted and having its cutting edge adapted to engage a flat part of a mold, spring means for pressing said trimming knife into resilient engagement with said flat part, a plurality of molds having flat parts for engagement with a knife, said knife extending at an acute angle to the plane of said flat parts, and means for spanning the spaces between separate molds whereby the knife is adapted to slide relative to the molds and flat part and trim off excess batter located on said flat parts.

8. In an ice cream cone machine, the combination of a female mold of substantially conical shape for molding a cone during the baking thereof, said mold having a trimming surface at the open end thereof, and a trimming knife comprising a blade extending transversely to the major axis of said mold, resilient means for urging said blade against said trimming surface, and means for producing relative motion between said mold and said blade against the edge of said blade to trim a cone in said mold, said knife being provided with guide means carried thereby for spanning the space between successive molds to assure the proper elevation of the knife with respect to successive molds.

SOL S. LEAF.
REGOLO PANZA.